INVENTOR.
WILLIAM C. WEHNER.
BY
Burton & Parker
ATTORNEYS

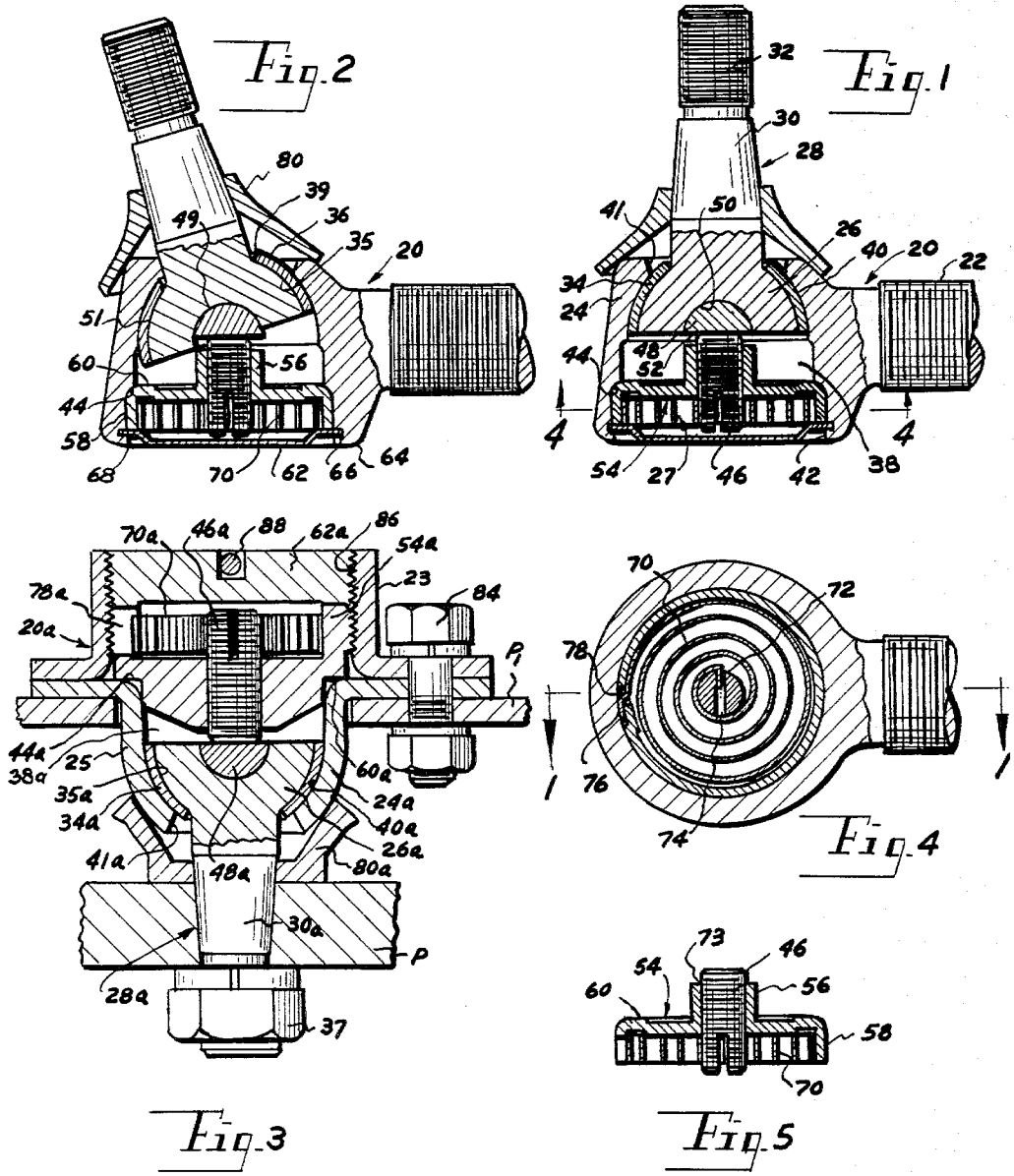

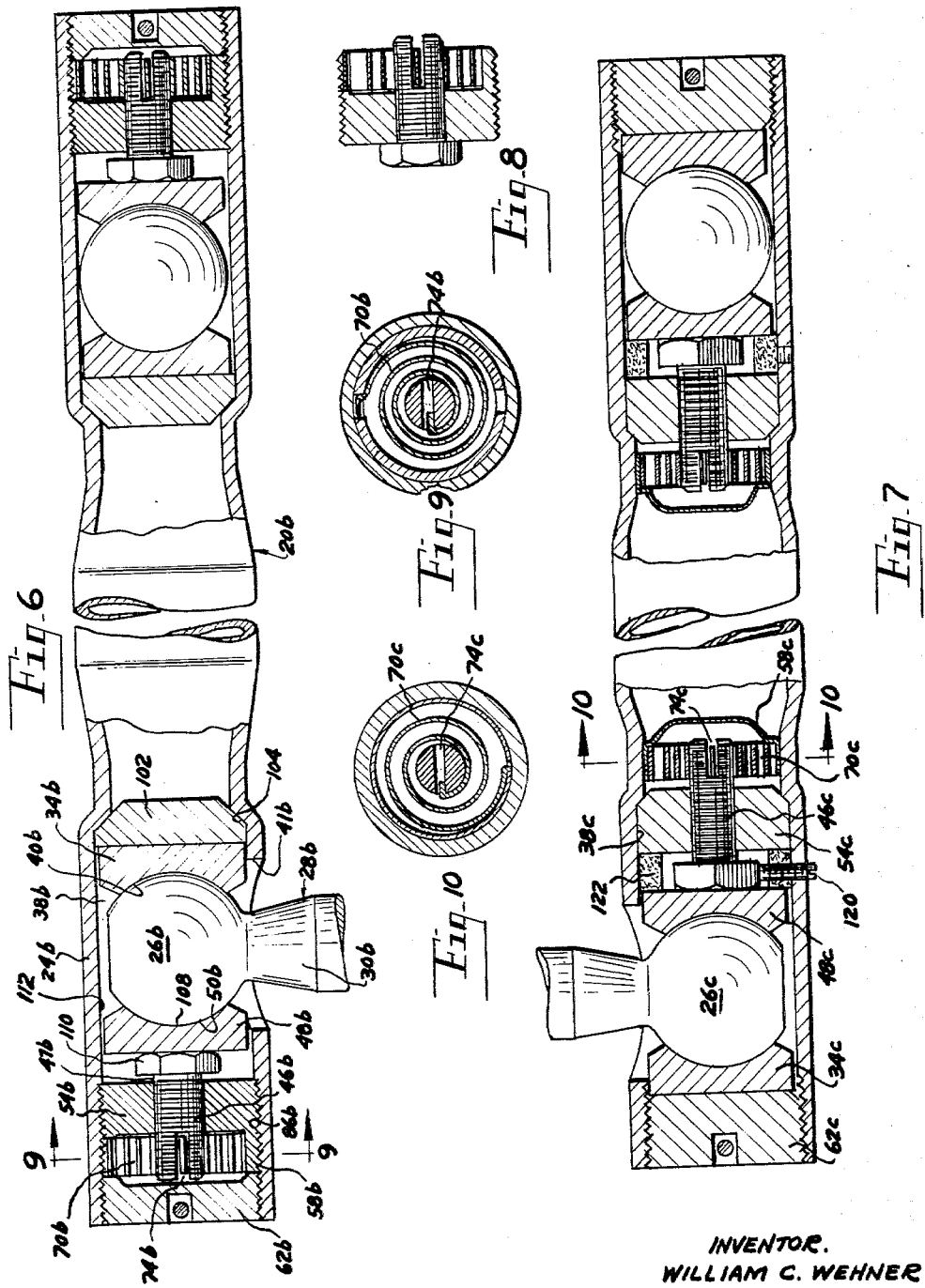

May 10, 1966  W. C. WEHNER  3,250,555
SWIVEL JOINT
Filed Dec. 13, 1961  4 Sheets-Sheet 4
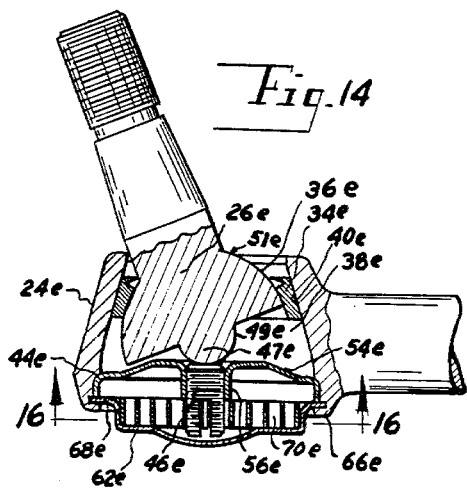
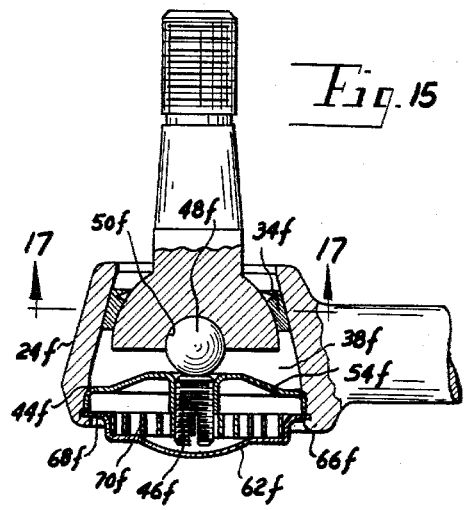
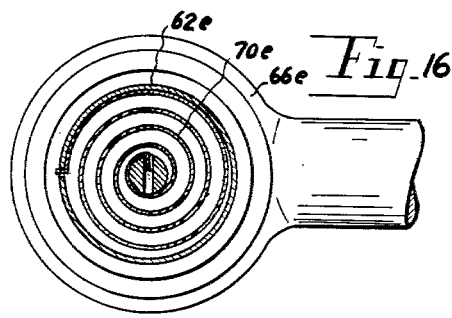
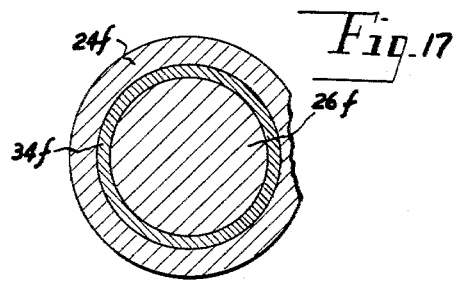
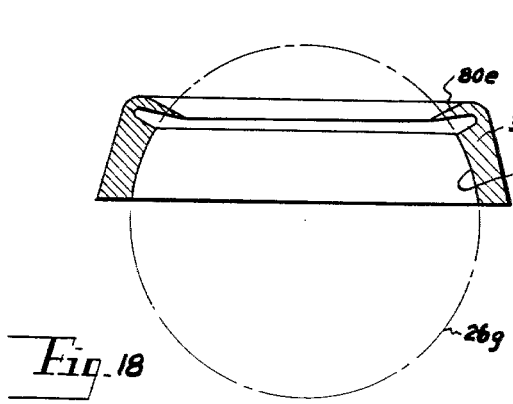
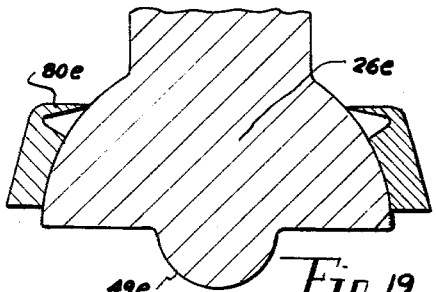
INVENTOR.
WILLIAM C. WEHNER.
BY
Burton & Parker
ATTORNEYS

United States Patent Office 3,250,555
Patented May 10, 1966

3,250,555
SWIVEL JOINT
William C. Wehner, 14891 Grandville,
Detroit 23, Mich.
Filed Dec. 13, 1961, Ser. No. 159,053
12 Claims. (Cl. 287—90)

This invention relates to swivel joints of the type having cooperating socket and stud members rotatable and rockable relative to each other while maintaining a firm connection therebetween as, for example, ball and socket joints. The invention has particular though not exclusive utility in automotive steering and suspension systems.

Despite the efforts of others there has been a continuing need, particularly in automotive steering and suspension systems, for a ball and socket joint which could be kept tight enough to prevent chatter and vibration while allowing the requisite freedom of rotation and tilting between the socket and stud. In general the problem has been attacked along two lines: First, by having the ball and socket yieldingly held together under spring tension, as exemplified by the disclosure in U.S. Patent 2,645,510, and, second, by having the ball and socket elements held positively together with provision being made for periodic retightening as looseness developed therebetween, as exemplified by the disclosure of U.S. Patent 2,954,993.

Neither approach has resulted in a completely satisfactory joint. The spring-tensioned ball and socket, while providing for a continuous tensioning of the ball against its wear pad and thereby correcting for wear as a result of long and/or hard usage, allows vibration and chatter when reversed or impact loading occurs exceeding the spring tension, and this while in itself undesirable, leads to a "pumping" or sucking action within the socket, as the ball leaves its wear pad momentarily, thus drawing dirt or foreign material into the socket even in well sealed constructions. In the positively held ball and socket arrangements where no provision for adjustment is made, manufacturing tolerances frequently result in very loose or very tight assemblies and permit no takeup as wear occurs, thereby allowing vibration and chattering and rapid failure of the joints. Where provision for adjustment is made, expensive periodic inspection and tightening by "free feel" or torque wrenches is necessary, and as the danger to life and property involved in a failure to inspect and properly adjust at regular intervals is always attendant, much is left to human error.

The invention herein disclosed utilizes the advantages of each of the aforementioned approaches but without their disadvantages, and offers other advantages not present in either of them.

An object of the invention is the provision of a joint which will withstand continuous shock, and reverse loading, over long periods without looseness developing between the cooperating socket and stud members while allowing the requisite freedom of rotation and tilting therebetween.

Another object of the invention is the provision of a joint in which the cooperating socket and stud members are positively, as distinguished from yieldingly, held together by a predetermined, and for all practical purposes, constant or uniform force throughout the life of the joint, even though wearing of cooperating surfaces of the socket and stud may occur.

Another object of the invention is the provision of a joint in which periodic adjustment and inspection are unnecessary.

Another object of the invention is the provision of a joint in which the cooperating socket and stud members are positively held together and adjustment take-up for wear therebetween is automatically effected.

Another object of the invention is the provision of a joint in which the contact pressure of the wear pad against the stud head or ball is substantially independent of manufacturing tolerances and may be of a very low order to minimize frictional wear and associated heat generation and allow great freedom of movement between the socket and stud.

Another object of the invention is the provision of a joint in which the ball, or stud head, cannot unseat from its supporting surface within the socket thereby preventing "pumping" or sucking of dirt or other foreign matter into vital bearing areas.

Another object of the invention is the provision of a joint in which misalignment of ball and socket elements arising from manufacturing tolerances or unequal wear is automatically compensated for.

Other objects, advantages and meritorious features will become more fully apparent from the following specification, claims and drawings wherein:

FIGS. 1 and 2 disclose a swivel coupling of the so-called vertical socket or "Indian pipe" design embodying my invention;

FIG. 3 discloses a modified construction of a swivel joint embodying my invention particularly adapted for use in upper or lower automotive steering knuckles;

FIG. 4 is a cross-sectional view taken on the line 4—4 of FIG. 1;

FIG. 5 is a detail of the wedging means hereinafter described for use in a construction of the type shown in FIG. 1;

FIG. 6 is an automotive type drag link embodying my invention;

FIG. 7 is another form of drag link embodying my invention;

FIG. 8 is a detail of the wedging means shown in FIG. 6 differing therefrom in that the screw-threaded member has been tightened into its supporting female threaded member;

FIG. 9 is a cross-sectional view taken on the line 9—9 of FIG. 6;

FIG. 10 is a cross-sectional view taken on the line 10—10 of FIG. 7;

FIG. 14 is another embodiment of my invention;

FIG. 15 is a further embodiment of my invention;

FIG. 16 is a cross-sectional view taken substantially on the line 16—16 of FIG. 14;

FIG. 17 is a cross-sectional view taken on the line 17—17 of FIG. 15;

FIG. 18 is a cross-sectional view through a ball sealing and bearing ring particularly adapted for use with a ball and socket joint of the types shown in FIGS. 14 and 15, though not limited exclusively thereto; and FIG. 19 shows the sealing and bearing ring of FIG. 18 in seated relation upon a ball member of the type shown in FIG. 14.

Figure 12:
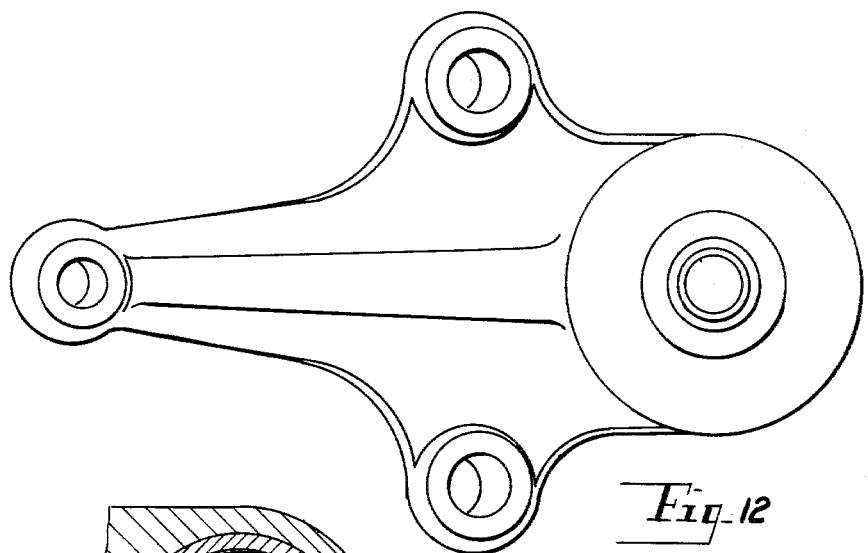
FIG. 12 is a top view of the embodiment shown in FIG. 11.

In each of the swivel joint embodiments of the invention hereinafter described there are certain generally similar elements and these are assigned common reference numerals having differing alphabetical subscripts. The construction of FIGS. 1 and 2 will be described in detail so that not only will its construction and operation be understood but a foundation will be laid for ready understanding of the remaining embodiments without the necessity of burdensome repetition.

As shown in FIG. 1 the joint device comprises a body or housing 20 having a threaded end portion 22, and a stud 28 having a threaded outer end portion 32, with the stud and body coupled together for relative rotation and tilting therebetween. Portions 22 and 32 are adapted to be connected to the relatively movable devices (not shown) between which the joint is to be secured. The body includes a socket portion 24 defining an internal socket space 38 opening outwardly at opposite ends at 41 and 42 (the latter being closed as hereinafter described). Within the socket the head means or ball 26 of the stud is received with the shank 30 thereof, which may be tapered as shown, extending outwardly of the socket through open end 41 thereof. Means in the socket provide a spherically curved ball or head supporting bearing surface against which the head bears and through which the shank 30 extends. Disposed on the opposite side of the head from such spherical head supporting bearing surface and extending between the head and body are means generally indicated at 27 cooperating with the head to non-yieldingly urge the same continuously and with substantially constant force against such surface so that the stud head is positioned and held within the socket for rotatable and tilting movements relative to the body.

More specifically the socket 38 is provided with a spherically curved end wall or bearing surface 40 through which the socket opens outwardly at 41. The head means 26 includes a bearing portion 34 having inner and outer spherically curved bearing surfaces 35 and 36 respectively and a shank receiving hole 39. The bearing portion 34 is mounted on the stud head to provide a bearing surface cooperative with the spherically curved surface 40 of the socket. The interior of the socket is provided with a circumferential stop shoulder 44.

The means 27 for urging and non-yieldingly maintaining the stud head 26 in seated engagement with the bearing surface or wall 40 of the socket, extends, as shown in FIG. 1, between the stud head and the body or housing on the opposite side of the head from the spherical surface 40. Such means includes a spring-tensioned wedging part 46 supported against yielding movement under forces tending to unseat the head 26 from the bearing surface 40 with such part tensioned in a direction wedging the stud head continuously and non-yieldingly against the bearing surface. Such wedging part is shown in FIG. 1 as including a screw-threaded member having stud contacting means thereon having a spherically curved bearing surface disposed at one end of such part engaging the stud head such that the head may rotate and tilt relative to part 46 while the part holds the head against the bearing surface 40 of the socket. In FIG. 1 such stud contacting means comprises a half ball insert 48 received in a complementary recess 50 in the stud head means on the opposite side thereof from the spherically curved portion 34 with the screw-threaded member bearing against the flat surface 52 of the half ball 48. The spherically curved surface 49 of the ball insert nestles against the spherically concave surface of the recess in rockable and rotatable bearing relationship therewith. The screw-threaded member 46 has a flat end face adapted to bear in flush relationship against the surface 52 of the half ball as shown in FIGS. 1 and 2 maintaining the half ball in the position shown in such figures despite rotation and tilting of the stud relative to the body.

The surface 52 of the half ball 48 is capable of shifting laterally relative to the end of the screw member 46, or in other words transverse to the axis of the screw members to compensate for any misalignment between the axis of the screw-threaded member 46 and the center of tilting motion of the stud and thereby compensate for any misalignment as a result of manufacturing tolerances. In effect the stud head is capable of floating laterally relative to the wedging means as a result of this construction.

In addition to the spring-tensioned wedging part 46, the wedging means 27 includes a support for the wedging part shown in FIGS. 1 and 2. Such support comprises an inverted cup-shaped member 54, the bottom wall of which is provided with an internally threaded boss 56 threadedly receiving part 46. Cup member 54 is telescoped within the socket 38, the fit being sufficiently tight to prevent lateral movement of the cup member 54 within the socket. The bottom wall 60 of the cup member 54 is adapted to abut, as shown in FIGS. 1 and 2, the shoulder 44 of the socket 38. The cup member 54 is held within the socket against axially outward dislodgment by any suitable housing contacting means, but preferably for simplicity of construction and ease of manufacture, and to keep foreign matter from entering the socket, a dust cover or closure plate 62 is received within the open end 42 of the socket and bears against the edge of the bottom wall 60 adjacent the side wall 58 of the cup member 54. The closure member 62 is held within the open end of the socket by spinning over the lower end 64 of socket portion 24 as at 66 to securely trap the cover 62 within the socket and positively prevent axial outward movement thereof under forces exerted thereagainst by the cup 54. This spinning of the end 64 of the socket portion 24 of the body will also serve to seal the closure 62 within the socket preventing the entry of foreign matter from this end of the socket. Should the dust cover or closure member 62 be formed of sheet metal, it may be found desirable to fold the metal upon itself as at 68 to provide a reinforced rim.

The means for urging the wedge member 46 upwardly and against the half ball 48 comprises, in addition to the cooperating threads of the member 46 and the internal threads in the boss 56, a spiral spring 70 disposed in the housing in a flat annular space and in concentric arrangement around the part 46 with the inner end 72 engaged or anchored within a slot 74 provided in the screw member 46 and with the outer end of the spring being secured to a portion of the swivel joint and held thereby in torque reacting relation with the housing. As shown, the outer end of the spring is offset as at 76 and received through a side opening slot 78 in the rim or wall 58 of the cup with such end of the spring bearing against the encircling wall of socket 38 as more particularly shown in FIG. 4, to be engaged within such slot against unintended dislodgment. With the parts of the joint in the assembled position shown in FIGS. 1 and 2, the spring is under a tension tending to cause the screw-threaded part 46 to thread its way upwardly placing the half ball 48 under a compressive loading urging the stud head 26 continuously and non-yieldingly against the bearing surface of the insert 34. The threads of the screw member 46 are of a sufficiently gradual pitch so that the screw member 46 is self-locking within the cup member, that is to say an axial force directed downwardly against the part 46 will not cause the part to thread its way downwardly, but rather part 46 will resist such axial force without yielding movement. The amount of axial force imposed on the stud head by the screw-threaded part 46 is a function of the tension imposed on the part by the spring 70, and this may be varied, within the limits of the spring, by the amount by which the spring is "wound up" prior to assembly of the wedging means 46 in the joint.

The spiral spring 70 does not require many "wind-up" turns in order to provide sufficient force to hold the ball 26 properly seated. In one design similar to FIG. 1, five or six "wind-up" turns were sufficient when employing a ⅜ inch screw of 16 threads per inch, since for one revolution of the screw $\frac{1}{16}$ inch of wear will be taken up. A spring suitable for this application may be stressed up to 350,000 p.s.i. without failure. If a one pound torque spring is employed in combination with a screw of 16 threads per inch, the theoretical axial thrust on ball 26 would be approximately 100 pounds and when multiplied by a thread efficiency of say 35% minimum, would result in an actual axial thrust of at least 35 pounds. Obviously by varying the torque of the spring or the number of threads per inch of the screw, greater or lesser axial loading on the ball 26 may be accomplished.

In practice, the members 46 and 54 are first threaded together and then the spiral spring 70 is seated in the cup 54 with its end 76 engaged with the wall of the cup and with the slot 74 of the screw 46 engaged with the end 72 of the spring. Thereafter further threading of the member 46 into the cup will cause the spring to be wound up. Obviously the direction of thread pitch must be in proper relation to the direction of spiral of spring 70. As aforementioned the amount of this winding of the spring will determine the force exerted by the screw on the stud head and may be varied as desired within the limit of any given spring. To temporarily lock screw member 46 against unwinding until the cup 54 is staked in place in the socket, the threads of the screw 46 may be upset slightly as at 73. Upon staking of cup 54 within the socket 38 and before cover 62 is placed in opening 42, the screw part 46 is threaded upwardly to release it from its temporary locked condition. The screw will now unwind upwardly under the influence of spring 70 to exert the predetermined force upon the stud head. Thereafter the plate 62 is positioned within opening 42 and the end 64 of the socket portion of the body spun over against the peripheral edge of the plate to secure it permanently in place and making it effectively a part of the housing 20.

In order to prevent the entrance of foreign matter within that end of the socket from which the stud extends a suitabe sealing cover may be provided as shown at 80. Such cover may be formed of any suitable material such as a flexible plastic whose shape will change to accommodate for tilting movement between the stud and body. The seal 80 is held in the position shown in FIGS. 1 and 2 by a tight encirclement around the stem 30 of the stud with the opposite end of the seal riding on the upper surfaces of the socket portion of the body and shiftable thereon as shown in FIGS. 1 and 2.

Thus it will be apparent that a constant force is brought to bear on ball 26 seating it against its spherical seat in socket 38, and compensating automatically for any wear. Since the screw part 46, cup 54 and cover 62 are, for practical purposes, non-resilient, and any wear between bearing surfaces is automatically compensated for, no pumping action or chatter is possible as ball 26 cannot leave its seat against wall 40 even under severe reverse loading. It is also apparent that the other advantages aforementioned are also provided, and manufacturing cost for the entire assembly is practically the same as present day compressive spring type joints such as that of U.S. Patent 2,645,510.

The remaining embodiments of the invention each utilize the basic principles of the joint described in connection with FIGS. 1, 2 and 4. In FIG. 3 the body member or housing 20a is formed of two half sections 23 and 25, which may be stampings, cooperatively defining the socket portion 24a of the joint and interiorly providing a socket 38a having a bearing surface 40a of spherical shape against which the head 26a with its bearing cap 34a of the stud 28a bears, with the stem or shank 30a extending outwardly of the socket through an opening 41a in the spherically curved end wall 40a thereof for securement to a part P. The stem 30a may be tapered as shown and threaded at its outer end for reception thereon of a nut 37 for tightly securing the stem within the part P.

The body sections are rigidly secured together and to the other part P₁ by bolts or the like 84 extending through integral flanges of the body sections. Parts P and P₁ are the parts between which the joint is secured to allow relative movement between such parts. The bolt 84 shown is, of course, merely one bolt of a plurality disposed in circumferentially spaced apart relation around the body 20a.

Body section 23 is shown as being internally threaded as at 86 to threadedly receive the cup-shaped member 54a which carries in threaded relationship similar to that of FIG. 1, a screw-threaded member 46a. The cup 54a is shown as a machined part, while the cup of FIGS. 1 and 2 is shown in the form of a stamping. Similar to FIG. 1 a spiral spring 70a is received within the cup 54a being secured at opposite ends in like fashion to the FIG. 1 embodiment. The body or housing 20a is provided with an internal shoulder 44a against which a co-operating portion 60a of the cup member 54a is seated. Member 54a is threaded into section 23 of the body to be seated against the shoulder 44a as shown in FIG. 3. The screw threaded member 46a is under tension by spring 70a to urge the stud head 26a against the bearing surface 35a of the socket. Member 54a is locked in place within the body by a cooperating combination cover and "lock nut" 62a threadedly received within body section 23 and abutting the member 54a as shown. If desired the cover 62a may be provided with a transverse slot within which a cotter pin 88 is received which is extended at opposite ends into cooperating holes (not shown) in the wall of body section 23.

A suitable seal 80a may be provided encircling the stem 30a of the stud to prevent the entrance of foreign matter through the opening 41a of the socket. The operation of the embodiment of FIG. 3 corresponds to that above described in connection with the embodiment of FIGS. 1 and 2.

FIG. 6 shows the invention embodied in an automotive type drag link comprising a tubular body 20b providing at opposite ends socket portions for the reception and support of the head 26b of a stud 28b having an outwardly extending stem or shank portion 30b. The socket portions and cooperating mechanism at opposite ends of the tubular body 20b are of similar construction and therefore a discussion of one will suffice for both. The socket portion 24b of the tubular body 20b is provided with an internal socket 38b opening outwardly as at 41b with the stud extending outwardly through such opening. Within the socket a spherical seat 40b is provided against which the stud head 26b is urged. Seat 40b may be provided by a suitable bearing block insert 34b held against axial movement away from the stud head by a retainer block 102 shouldered against a reduced diameter shoulder portion 104 of the body.

Wedging means are provided for continuously nonyieldingly urging the stud head 26b against the bearing surface 40b, such means including a screw-threaded member 46b threadedly received in an internally threaded cup-shaped supporting member 54b with bearing means being provided at the end of member 46b for engaging that side of the stud head opposite surface 40b for urging the stud head against such surface. Such means are shown as comprising a bearing block 48b having a spherical seat 108 cooperating with a spherical surface portion 50b of the stud head. The end of member 46b may be provided with a head 110 of increased diameter which laterally floatingly engages the bearing block 48b and holds the same in the position shown in FIG. 6. The block 48b is sized to closely slidably fit within the encircling wall 112 of the socket.

Member 54b is externally threaded to be threadedly received within the threaded entrance 86b of the socket. Screw member 46b is provided with a slot 74b within which the inner end of a spiral spring 70b is anchored with the outer end of the spring anchored within a suitably provided slot in the wall 58b of the member 54b. Similar to the foregoing embodiments the spring is seated in the cup-like recess in member 54b. Instead of providing an upset thread as at 73 in FIG. 5 to temporarily lock the screw against unwinding during assembly, the screw 46b need merely be tightened so that its head 110 is firmly seated against member 54b as shown in FIG. 8 to hold the screw against unwinding under the tension of the spring during assembly of the member 54b within the threaded entrance of the socket. The screw may be loosened from this temporarily locked condition by a screwdriver received in the slot 74b thereof once the block 54b is properly positioned. Inward movement of block 54b may be limited by the extent of the internal threads 86b. The block 54b is secured against outward axial movement by a closure plate 62b similar to plate 62a.

In FIGS. 7–10 another form of drag link is shown. In this embodiment the wedging means is mounted at the other side of the stud head from that shown in FIG. 6, such means including a screw thread member 46c threadedly received within a supporting block 54c which is press-fitted within the socket 38c. The screw is placed under torque-tension by a spiral spring 70c whose inner end is anchored within a slot 74c in the screw and whose outer end is anchored in a slot formed in the cup 58c which is also press-fitted within the socket. The press fit of 54c and 58c is sufficiently tight so that they will not rotate within the socket.

A bearing block 48c is provided laterally floatingly abutting the end of screw 46c and adapted to bear against the stud 26c. The opposite side of the head is supported within a block 34c slidably received within the socket 38c and held therein against outward movement by a threaded closure 62c of a construction similar to that of closure 62a of FIG. 3.

During assembly of the joint shown in FIG. 7 the spring cup 58c with the spring therein is pressed into the socket to the position shown and thereafter block 54c is pressed into place engaging the spring. The screw is then threaded inwardly to tension the spring and is held in position by a set screw 120 threaded through the side wall of the socket to engage temporarily the head end of screw 46c. A felt washer 122 is provided through which the set screw extends. Upon subsequent completion of assembly by the insertion of block 34c, stud head 26c, bearing block 34c and closure 62c, the set screw 120 may be removed. The felt washer will prevent the entry of foreign matter into the assembly following removal of the set screw. Upon removal of the set screw the screw thread member 46c will be free to rotate under the tension of spring 70c to urge the stud head 26c non-yieldingly against the bearing block 34c.

Figure 13:
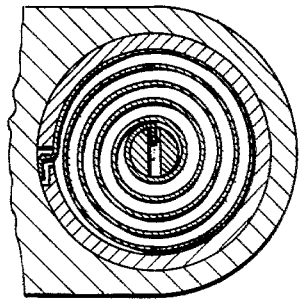
FIG. 13 is a cross-sectional view taken substantially on the line 13—13 of FIG. 11.
Figure 11:
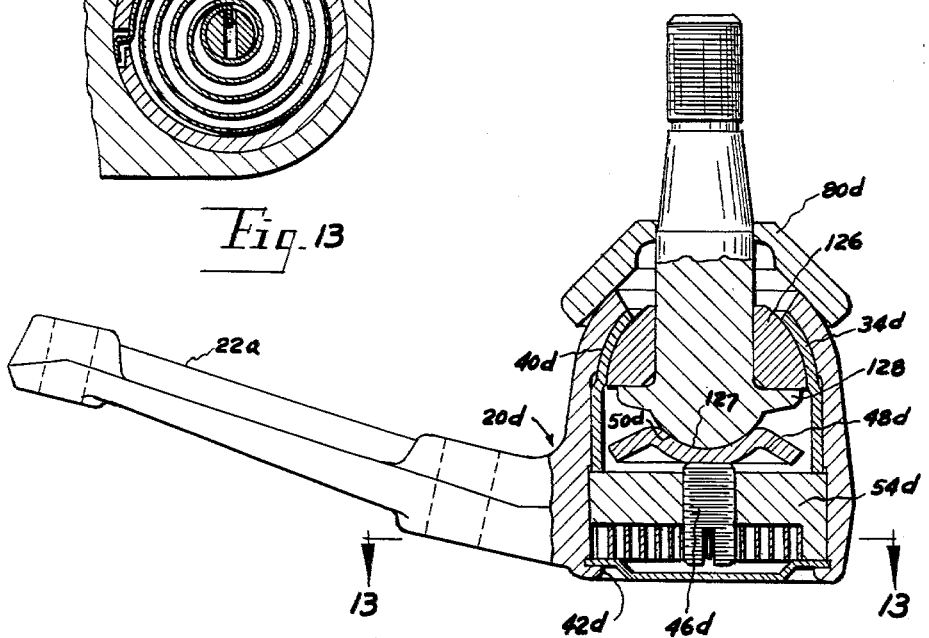
FIG. 11 is another embodiment of my invention having an integral attaching arm and with the joint designed for particular utility in automotive independent ball type wheel suspension systems.

The embodiment shown in FIGS. 11–13 is generally similar to that of FIG. 1. The body or housing 20d is provided with an integral attachment arm 22a of a different type than that shown in FIG. 1 adapting the joint for a particular application in an automotive wheel-supporting system, for example that for which the construction shown in U.S. Patent 2,645,510 is intended. The bearing insert 34d is of a greater axial length than the corresponding insert in FIG. 1 and the cup-shaped member 54d bears against an end of the insert as shown urging the insert upwardly and against the internal wall 40d at the spherically open end of the socket. Insert 34d does not rock within the socket as is the case of bearing 34. The stud head is modified from that shown in FIG. 1 in that it is provided with a separate bearing cone 126 removably received on the stud and having a spherical bearing surface complementing and cooperating with the internal spherical surface of insert 34d. The stud head is provided with a radial flange 128 underlying this conical block and supporting the same. The stud head is provided with a spherical surface of convex configuration as shown at 50d. Means are provided at the end of the screw thread member 46d for cooperating with the spherical surface 50d of the head to urge the stud head upwardly to seat the cone 126 against the spherical bearing surface of insert 34d. Such means include a generally hat-shaped bearing member 48d having a spherically concave surface 127 cooperating with surface 50d of the stud head. Member 48d abuts the end of screw 46d in laterally floating relation. The screw 46d is tensioned to thread upwardly against member 48d in the same fashion as the FIG. 1 embodiment with the open end 42d being closed similarly to the construction in FIG. 1. A suitable seal is provided at 80d.

In the embodiments shown in FIGS. 14 and 15 the screw thread members respectively indicated at 46e and 46f are carried by cup-shaped members 54e and 54f each of which is provided with a central boss as at 56e in FIG. 14 internally threaded to receive the screw. The members 54e and 54f are press-fitted within the socket 38e and 38f to abut an internal shoulder 44e and 44f of the socket. The closure members 62e and 62f of these two embodiments corresponding to closure 62 of the embodiment of FIG. 1, is formed in a more pronounced cup-shape to receive and support therewithin the spiral spring. The closure members are each provided with a rim portion 68e and 68f respectively which is retained within the socket portion 24e and 24f by the lower end of the socket portion being spun over as at 66e and 66f similar to that of FIGS. 1 and 2. The inner end of the spiral spring 70e and 70f is received in the usual slot in the screw with the outer end of the spring received within a suitably provided slot in the wall of the cup-shaped closure.

In the embodiment of FIG. 14 the stud head 26e is provided with an integral half ball convex-like protrusion adapted to tiltably and rotatably bear against the inner end of the screw member 46e. The spherical surface 36e of the stud head is adapted to bear against a combination bearing insert and seal member 34e non-rockably received in the socket. Such insert is provided with a resilient dirt seal portion 80e as shown in FIGS. 18 and 19. The member 34e may be formed of a suitable resilient material. I have found that the resin sold by the E. I. du Pont de Nemours & Co., Inc. under the trademark Delrin is satisfactory. The inner wall 40e of the socket 38e is formed on a gradual self-locking taper slope so that upon seating of the bearing 34e therewithin the bearing will be taper-locked in place.

In the construction shown in FIG. 15 instead of an integral convex projection such as is shown in the embodiment of FIG. 14, the head is provided with a concave spherical seat 50f within which is received a ball 48f. The ball bears against the inner end of the screw thread member 46f. A combination bearing insert and seal indicated at 34f and of a construction similar to that shown in FIGS. 18 and 19 may be provided.

In FIG. 18 the insert 34e is shown in a relaxed condition. The phantom circle 26g represents the outline of a ball as the same would seat against the bearing surface 35e of the insert. It will be noted that the sealing lip extends inwardly beyond the outline of the ball. When the ball is seated within the insert, the lip 80e is yieldingly displaced to bear continuously resiliently against the surface of the head 26e as shown in FIG. 19, wiping such surface as the head rocks or rotates.

In the embodiments of the invention heretofore described it will be apparent to those skilled in the art that the center of generation of the spherical surfaces 40, 35, 49 and 51 of FIGS. 1 and 2, as well as their alphabetically suffixed derivatives in the other figures of the drawings, are theoretically coincident, and that as a result of manufacturing tolerances they will be substantially coincident. Any variation in such coincidence will of course be compensated for by the laterally floating connection between the screw and the stud head.

What is claimed is:

1. A self-adjusting ball joint device comprising, in combination: a housing defining a socket space provided with at least a partially spherically curved bearing surface therein, a load transmitting stud provided with head means having at least a partially spherically curved portion complementing said bearing surface and engaged therewith, said stud head means having an at least partially spherically curved surface in opposed relation to said spherically curved portion, said stud having a shank projecting out of the housing through an opening therein, an externally threaded member threadedly engaged within an internally threaded member with the thread pitch being self-locking and with such members disposed in the housing, one of said members having thereon stud contacting means engaging said spherically curved surface of said head means on the opposite side thereof from said spherically curved portion, the other of said members having housing contacting means reactingly engaging said housing to limit movement of such member away from said bearing surface, said members upon relative threading movement thereof urging the spherically curved portion of the stud head means against said spherically curved bearing surface, one of said members having a portion spaced from the housing to provide an annular flat spiral spring-receiving space, a multi-turn spiral spring wound upon itself around the last-mentioned portion with a plurality of turns lying one within the other substantially in a common plane extending radially outwardly of the threaded connection between the members and disposed within said spring receiving space, one end of said spring secured to one of said threaded members and the other end secured to a portion of the device radially outwardly of the thread axis and held thereby in torque reacting relation with the housing to maintain a torque tension between said members constantly biasing one of said members relative to the other to axially advance the threads to maintain said stud head means in continual engagement with said bearing surface.

2. The invention as defined in claim 1 characterized in that the spring is a spiral formed of a flat relatively thin ribbon of spring material.

3. The invention as defined in claim 1 characterized in that said portion of the device to which said other end of the spring is secured is a portion of the other of said threaded members whereby the reaction of the spring is delivered directly to said threaded members.

4. The invention as defined in claim 3 characterized in that said housing includes a closure member secured to the housing and closing an end of said socket space opposite said bearing surface and said housing contacting means engages said closure member, and the threadedly connected members together with the spring wound in tension are insertable as a unit into said socket space prior to securement of the closure member to the housing, and means are provided for releasably holding said threadedly connected members against threading movement under tension of said spring during assembly of the unit in the housing.

5. The invention as defined in claim 1 characterized in that said portion of the device to which said other end of the spring is secured is a portion of the housing.

6. The invention as defined in claim 1 characterized in that one of said contacting means provides a laterally floating engagement, transverse to the axis of the screw threaded members, between its threaded member and the portion of the device it engages to compensate for spherical eccentricity of the spherically curved surfaces of the device.

7. The invention as defined in claim 1 characterized in that said at least partially spherically curved surface of the stud head means is a spherically curved concave surface and the stud contacting means is spherically convex.

8. The invention as defined in claim 1 characterized in that said housing comprises a pair of peripherally flanged members secured together at their peripheral flanges and defining the socket space between the members.

9. The invention as defined in claim 1 characterized in that said housing includes a closure member secured to the housing and closing an end of said socket space opposite said bearing surface, and said housing contacting means engages said closure member.

10. The invention as defined in claim 1 characterized in that said complementally curved surface of the stud head means is a convex spherically curved surface and said stud head contacting means is provided with a concave surface overlying such convex surface providing a rockable bearing connection between the stud head means and the threaded members.

11. The invention as defined in claim 1 characterized in that the internally threaded member is cup-shaped and provided with a peripheral rim and a central boss through which axially extends a threaded aperture, and said spring is received in the cup-shape and a peripheral edge of the cup abuts a closure member of the housing.

12. The invention as defined in claim 11 characterized in that said cup-shaped member opens in a direction away from the stud head means and the externally threaded member extends from one side of the cup through the boss with a portion disposed within the cup shape of said member, and the spiral spring is received in said cup shape of the member with the inner end of the spring drivingly engaged with the other threaded member and with the outer end of the spring anchored in a side wall of the cup-shaped member.

References Cited by the Examiner

UNITED STATES PATENTS

| 216,627 | 6/1879 | Moore | 251—227 X |
|---|---|---|---|
| 1,055,168 | 3/1913 | Harrell. | |
| 1,561,972 | 11/1925 | Crawford. | |
| 1,883,782 | 10/1932 | Graham. | |
| 1,926,487 | 9/1933 | Krumm. | |
| 2,115,087 | 4/1938 | Schaefer. | |
| 2,240,432 | 4/1941 | Witchger. | |
| 2,456,546 | 12/1948 | Venditty. | |
| 2,823,055 | 2/1958 | Booth. | |

FOREIGN PATENTS

| 145,457 | 2/1952 | Australia. |
|---|---|---|
| 660,304 | 5/1938 | Germany. |
| 508,890 | 7/1939 | Great Britain. |

CARL W. TOMLIN, *Primary Examiner.*

WALTER A. SCHEEL, *Examiner.*

A. V. KUNDRAT, *Assistant Examiner.*